United States Patent
Tsuda et al.

(10) Patent No.: US 11,413,788 B2
(45) Date of Patent: Aug. 16, 2022

(54) INCISED PREPREG AND METHOD FOR PRODUCING INCISED PREPREG

(71) Applicant: Toray Industries, Inc., Tokyo (JP)

(72) Inventors: Terumasa Tsuda, Ehime (JP); Kentaro Adachi, Ehime (JP); Yuzo Fujita, Ehime (JP); Takuya Karaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 619 days.

(21) Appl. No.: 16/335,467

(22) PCT Filed: Aug. 7, 2017

(86) PCT No.: PCT/JP2017/028579
§ 371 (c)(1),
(2) Date: Mar. 21, 2019

(87) PCT Pub. No.: WO2018/055932
PCT Pub. Date: Mar. 29, 2018

(65) Prior Publication Data
US 2019/0232528 A1    Aug. 1, 2019

(30) Foreign Application Priority Data

Sep. 26, 2016 (JP) .............................. JP2016-186526

(51) Int. Cl.
*B29B 11/16*   (2006.01)
*C08J 5/24*    (2006.01)
*B29C 70/02*   (2006.01)

(52) U.S. Cl.
CPC .............. *B29B 11/16* (2013.01); *B29C 70/02* (2013.01); *C08J 5/24* (2013.01); *C08J 2363/00* (2013.01)

(58) Field of Classification Search
CPC .......... C08J 5/042; C08J 5/24; C08J 2363/00; B29B 11/16; B29B 15/08;
(Continued)

(56) References Cited

U.S. PATENT DOCUMENTS

| 4,992,127 A | 2/1991 | Kishi et al. |
| 2010/0233423 A1 | 9/2010 | Corden et al. |

FOREIGN PATENT DOCUMENTS

| JP | 01289837 A | 11/1898 |
| JP | 63247012 A | 10/1988 |

(Continued)

OTHER PUBLICATIONS

International Search Report and Written Opinion for International Application No. PCT/JP2017/028579, dated Sep. 5, 2017, 9 pages.

*Primary Examiner* — Camie S Thompson
(74) *Attorney, Agent, or Firm* — RatnerPrestia (57) ABSTRACT

Provided is an intermediate base material (incised prepreg) which has exceptional surface quality and mechanical properties when solidified and with which it is possible to obtain a fiber-reinforced plastic having excellent three-dimensional shape conformance properties. This incised prepreg has, in a prepreg that includes a resin and reinforcing fibers oriented in one direction, incisions substantially parallel to the orientation direction of the reinforcing fibers (the incisions substantially parallel to the orientation direction of the reinforcing fibers are referred to as parallel incisions) and incisions that cut across the reinforcing fibers (the incisions that cut across the reinforcing fibers are referred to as intersecting incisions).

12 Claims, 4 Drawing Sheets

(58) Field of Classification Search
CPC ......... Y10T 156/1044; Y10T 156/1056; Y10T
156/1064; Y10T 428/24314; Y10T
428/24124; B29K 2101/12; B29C 70/083;
B29C 70/545; B29C 70/20; B29C 70/14;
B29C 70/465; B29C 70/205
USPC ..... 428/292.1, 136, 113, 364, 375; 264/154,
264/258; 156/182, 222, 252, 257
See application file for complete search history.

(56) References Cited

FOREIGN PATENT DOCUMENTS

| | | | |
|---|---|---|---|
| JP | 2008238809 | A | 10/2008 |
| JP | 2012087420 | A | 5/2012 |
| JP | 5167953 | B2 | 3/2013 |
| JP | 5223354 | B2 | 6/2013 |
| JP | 2014189722 | A | 10/2014 |
| JP | 2014210932 | A | 11/2014 |
| JP | 2016108348 | A | 6/2016 |

INCISED PREPREG AND METHOD FOR PRODUCING INCISED PREPREG

CROSS REFERENCE TO RELATED APPLICATION

This is the U.S. National Phase application of PCT/JP2017/028579, filed Aug. 7, 2017, which claims priority to Japanese Patent Application No. 2016-186526, filed Sep. 26, 2016, the disclosures of these applications being incorporated herein by reference in their entireties for all purposes.

FIELD OF THE INVENTION

The present invention relates to an incised prepreg suitable for use as an intermediate substrate in producing a fiber reinforced plastic that has good shape conformability in molding and high mechanical properties after the curing. The present invention also relates to its production method.

BACKGROUND OF THE INVENTION

Fiber reinforced plastics made of reinforcing fibers and a resin have high specific strength and high specific modulus as well as excellent mechanical properties and high functional properties such as weather resistance and chemical resistance, and accordingly, fiber reinforced plastics have received a wide attention as materials for industrial use such as structural elements of aircraft, spacecraft, motor vehicles, railways, ships, electric appliances, and sport gear, and their demands are increasing year by year.

An exemplary intermediate substrate for a fiber reinforced plastic is an SMC (sheet molding compound). This SMC is typically a sheet-shaped material that consists of chopped strands cut to about 25 mm and impregnated with a thermosetting resin are randomly dispersed, and this SMC is known as a material suitable for molding a fiber reinforced plastic having a complicated three-dimensional shape. However, the fiber reinforced plastics molded from the SMC were inevitably associated with the uneven distribution and orientation of the chopped strands and this resulted in the loss of mechanical properties of the molded article and increased variation of the value. A known molding method for producing fiber reinforced plastic that has stable high mechanical properties is an autoclave, a method that prepregs comprising continuous reinforcement fibers impregnated with a resin are laminated and molded. However, the prepregs prepared by using continuous fibers suffered from insufficient deformation capability, and this resulted in the generation of wrinkles or bracing of reinforcing fibers, and accordingly, molding a complicated shape such as a three-dimensional shape had been difficult.

In order to cover the defects of the material as described above, a material comprising a prepreg made of discontinuous reinforcement fibers impregnated with a resin that the continuous reinforcement fibers have been divided by forming incisions or notches has been disclosed (see, for example, Patent Documents 1, 2, and 3). This material is flowable, and exhibits reduced variation in the mechanical properties.

PATENT DOCUMENTS

Patent Document 1: Japanese Unexamined Patent Publication (Kokai) No. 63-247012
Patent Document 2: Japanese Patent No. 5167953
Patent Document 3: Japanese Patent No. 5223354

SUMMARY OF THE INVENTION

The materials produced by the methods described in Patent Documents 1 to 3 exhibit greatly improved mechanical properties and reduced variation compared to those of the SMC. However, strength of the article produced by the method of Patent Document 1 was insufficient for use as a structural elements and the conformability to three dimensional shapes was not optimized. The articles of Patent Documents 2 and 3 employ incisions with smaller opening with high surface quality and three dimensional conformability, and high surface quality and excellent mechanical properties after the solidification are realized while they still require further improvement in conformability.

In view of the situation of the background art as described above, the present invention is intended to provide an intermediate substrate (incised prepreg) which can be used in producing a fiber reinforced plastic exhibiting excellent surface quality and mechanical properties after the solidification as well as high three dimensional conformability.

For the purpose of obviating the problems as described above, the present invention adopts the means as described below. Accordingly, the present invention provides the following:

(1) A incised prepreg comprising a resin and unidirectionally oriented reinforcement fibers formed with incisions which are substantially parallel to the direction of the reinforcement fiber orientation (the incision which is substantially parallel to the direction of the reinforcement fiber orientation is hereinafter referred to as "parallel incision") and incisions intersecting the reinforcement fibers (the incision intersecting the reinforcement fibers is hereinafter referred to as "intersecting incision").

The present invention is capable of providing an intermediate substrate (incised prepreg) which can be used in producing a fiber reinforced plastic exhibiting excellent surface quality and mechanical properties after the solidification as well as high three dimensional conformability.

DETAILED DESCRIPTION OF CERTAIN EMBODIMENTS OF THE INVENTION

The inventors of the present invention found that production of a substrate exhibiting increased in-plane elongation as well as reduced resistance to in-plane shear deformation of the prepreg is effective for obtaining an intermediate substrate exhibiting good three dimensional conformability as well as excellent mechanical properties after production into a fiber reinforced plastic. Accordingly, the inventors of the present invention produced a incised prepreg comprising a resin and unidirectionally oriented reinforcement fibers formed with incisions intersecting the reinforcement fibers and incisions which are substantially parallel to the direction of the reinforcement fiber orientation to improve flowability in the direction of the reinforcement fiber orientation and in the plane perpendicular to the direction of the reinforcement fiber orientation, and also, to reduce resistance to in-plane shear deformation in the shaping of the incised prepreg to facilitate deformation of the prepreg to thereby improve three dimensional conformability. The inventors also confirmed that the problems as described above can be solved by such prepreg.

It is to be noted that the incision which is substantially parallel to the direction of the reinforcement fiber orientation is referred to as the "parallel incision" and the incision intersecting the reinforcement fibers is referred to as the "intersecting incision".

The "incision which is substantially parallel to the direction of the reinforcement fiber orientation (parallel incision)" is the incision wherein, when the projected length of each incision as described below is Ws, the value obtained by dividing the Ws by the incised length is up to 0.03.

With regard to this parallel incision of the present invention, any incision wherein the value obtained by dividing the projected length Ws as described below by the incised length is less than 0.03 is the parallel incision, and for example, the incision satisfying such condition of the parallel incision is regarded as the parallel incision even if the incision slightly breaks the reinforcement fiber whose orientation is disturbed in the prepreg.

The "incision intersecting the reinforcement fibers (intersecting incision)" is the incision wherein the value obtained by dividing the projected length Ws as described below by the incised length is in excess of 0.03.

Figure 1:
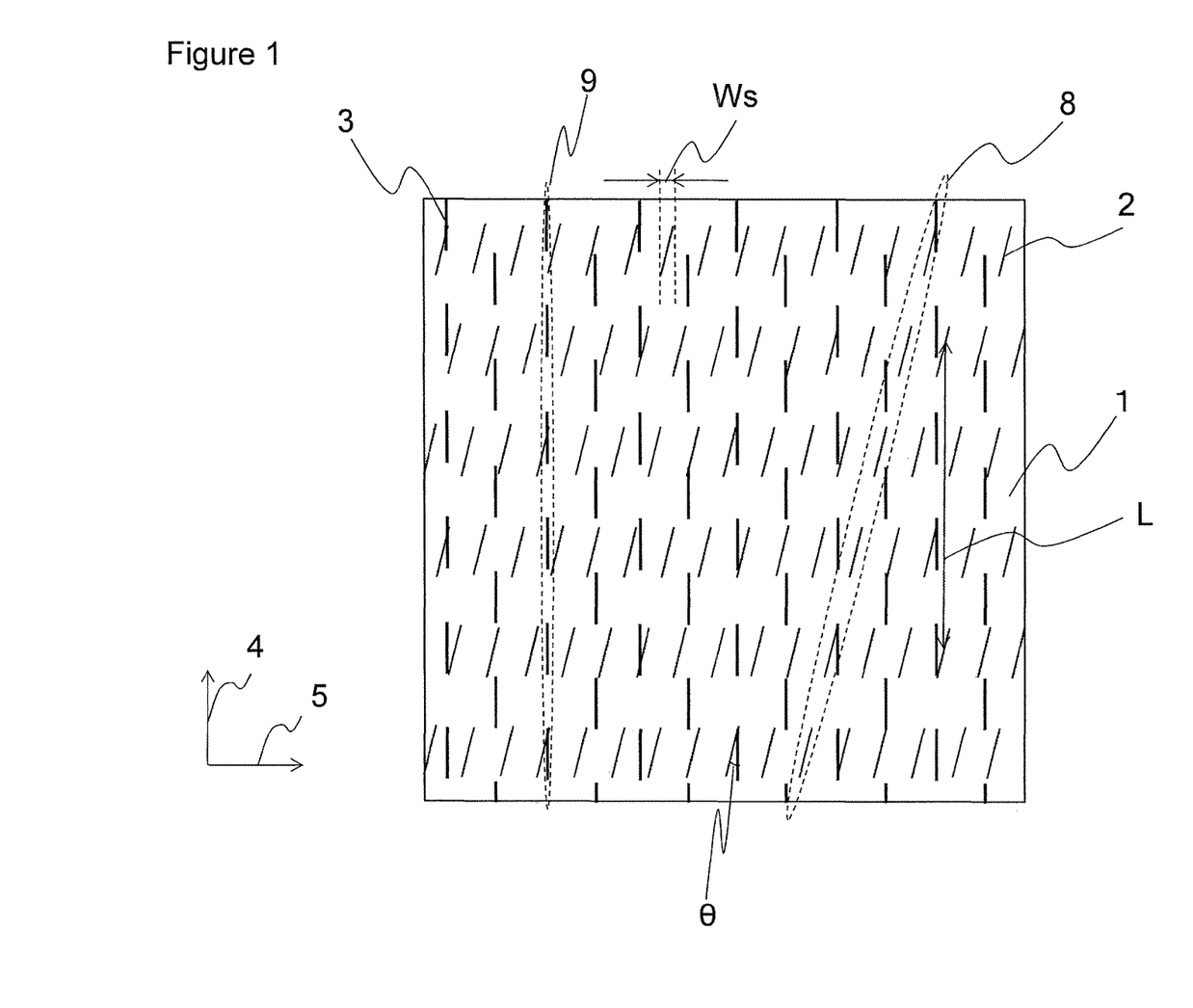
FIG. 1 is a schematic view of the incised prepreg of the present invention.

As shown in FIG. 1, the incised prepreg of the present invention 1 comprises a resin and unidirectionally oriented fibers, and the incised prepreg of the present invention has intersecting incisions 2 extending in the direction crossing the reinforcement fibers (namely, at an angle θ with the direction of the reinforcement fiber orientation of the prepreg 4) and parallel incisions 3.

More specifically, the intersecting incision is any incision wherein the value obtained by dividing the projected length Ws as described below by the incised length is in excess of 0.03, namely an incision wherein the angle θ shown in FIG. 1 and the like is at least a certain angle. More specifically, the intersecting incisions may be either intersecting incisions shown in FIG. 2 having the same positive or negative angle (+a) or intersecting incisions as shown in FIG. 3 wherein the angle θ is a large angle (more specifically, an angle θ of at least 30 degrees).

Since the incised prepreg of the present invention has unidirectionally oriented reinforcement fibers, use of this incised prepreg will enable to design of a molded article having any desired mechanical properties by stacking (laminating) of the incised prepregs so that the reinforcement fibers will be oriented in the desired direction.

In addition, elongation of the prepreg is normally difficult since the reinforcement fiber has high rigidity in the direction of the fiber orientation. However, the incised prepreg can be elongated in the direction of the reinforcement fiber orientation since the reinforcement fiber is divided by the intersecting incisions and the intersecting incisions open up in the course of the shaping. In addition, the incised prepreg can be easily elongated in the plane perpendicular to the direction of the reinforcement fiber orientation since the parallel incisions also open up in the course of the shaping. Furthermore, three dimensional conformability of the incised prepreg is also improved since deformation of the incised prepreg in the course of shaping is facilitated by the intersecting incisions and the parallel incisions.

The parallel incisions of the incised prepreg of the present invention that had been opened up become closed or shrinked in the process of the molding by flowing (moving) of the fibers and the resin in the surrounding area. Accordingly, the molded article has the mechanical properties equivalent to the molding article solely having the intersecting incisions, or even if small portions of the irregularly oriented reinforcement fibers in the prepreg are incised by the parallel incisions, the area of the fiber incision is limited to narrow areas, and the loss of the mechanical properties is limited to a slight level.

It is to be noted that, in this specification, the term "fiber" which is used alone or in the phrase including the fiber (for example, the "fiber direction") designates the reinforcement fiber unless otherwise noted.

Exemplary reinforcement fibers used in the incised prepreg of the present invention include reinforcement fibers prepared by using an organic fiber such as aramid fiber, polyethylene fiber, and polyparaphenylene benz oxazole (PBO) fiber, an inorganic fiber such as glass fiber, carbon fiber, silicon carbide fiber, alumina fiber, Tyrannofiber, basalt fiber, and ceramic fiber, a metal fiber such as stainless steel fiber and steel fiber, a boron fiber, a natural fiber, and a modified natural fiber for the fiber. Of these, carbon fibers are well adapted for use in members such as automobile panels wherein weight reduction is desired since carbon fibers are the lightest in the reinforcement fibers as mentions above and very excellent in specific strength and specific modulus as well as heat resistance and chemical resistance. Of these, the preferred is a polyacrylonitrile (PAN) carbons fiber in view of the ease of obtaining a high strength carbon fiber.

Examples of the resin used in the incised prepreg of the present invention (which is hereinafter also referred to as a matrix resin) include thermosetting resins such as epoxy resin, unsaturated polyester resin, vinyl ester resin, phenol resin, epoxy acrylate resin, urethane acrylate resin, phenoxy resin, alkyd resin, urethane resin, maleimide resin, and cyanate resin and thermoplastic resins such as polyamide, polyacetal, polyacrylate, polyfulfone, acrylonitrile butadiene styrene (ABS), polyester, acryl, polybutylene terephthalate (PBT), polyethylene terephthalate (PET), polyethylene, polypropylene, polyphenylene sulfide (PPS), polyether ether ketone (PEEK), liquid crystal polymer, vinyl chloride, polytetrafluoroethylene and other fluororesin, and silicone. Of these, the preferred is use of a thermosetting resin.

When the matrix resin is a thermosetting resin, the incised prepreg exhibits tackiness at room temperature, and the laminate of the incised prepregs are integrated by the sticking of the adjacent prepregs, and this enables the molding with the intended laminate constitution retained. On the other hand, in the case of the incised prepreg containing a thermoplastic resin exhibiting no tackiness at room temperature as the matrix resin, the incised prepregs slip after the lamination, and the laminate constitution is not retained in the course of the molding. As a consequence, the resulting fiber reinforced plastic exhibits highly uneven fiber orientation. This difference between the use of the thermosetting resin and the thermoplastic resin is significant particularly in the molding using a mold with irregular shape.

Although not particularly limited, the incised prepreg of the present invention may be attached to a tape-shaped support. When the incised prepreg is attached to a tape-shaped support, the incised prepreg can retain its morphology even if all fibers are divided by the incisions, and there will be no risk of disintegration of the prepreg by the falling of the fiber in the shaping. More preferably, the matrix resin is a thermosetting resin having tackiness. The exemplary tape-shaped supports include papers such as kraft paper, polymer films such as polyethylene and polypropylene, and foils of a metal such as aluminum which are optionally provided with a mold release agent such as silicone or "Teflon (Registered Trademark)" mold release agent or a vapor deposited metal film on the surface in order to provide releasability. Of the thermosetting resins, the preferred are epoxy resin, unsaturated polyester resin, vinyl ester resin, phenol resin, acrylic resin, and mixtures thereof. When the epoxy resin is used, the reinforcement fiber composite material obtained by combination with the carbon fiber will exhibit excellent mechanical properties.

As described above, the incised prepreg of the present invention has the intersecting incisions and the parallel incisions. While the reinforcement fibers divided by the intersecting incisions may be either all reinforcement fibers or some of the reinforcement fibers, it is preferable that substantially all reinforcement fibers are divided by the intersecting incisions in view of retaining the mechanical properties of the article molded from the incised prepreg at a certain level.

The "substantially all reinforcement fibers are divided by the intersecting incision" means that total area of the areas constituted from the continuous reinforcement fibers not divided by the incisions of the present invention and the resin in the prepreg is less than 5% of the total area of the prepreg.

In the present invention, the parallel incisions may have any length, and the length of the parallel incisions (hereinafter referred to as parallel incised length) may have periodicity, or alternatively, the parallel incised length may be substantially the same.

In the present invention, "the parallel incised length has periodicity" means that the parallel incision length changes in the direction of the reinforcement fiber orientation at a certain periodicity.

In the meanwhile, "the parallel incised length is substantially the same" means that, when the average of the parallel incised length is determined, proportion of the parallel incisions wherein ratio of each parallel incised length to the average (each parallel incised length/the average of the parallel incised length) is up to 0.5 or at least 1.5 is less than 5%.

The interval of the parallel incisions in the direction 4 of the reinforcement fiber orientation is arbitrary, and this interval (the interval of the parallel incisions in the direction of the reinforcement fiber orientation is hereinafter referred to as the parallel incision interval in the orientation direction) may have periodicity, or alternatively, the parallel incised interval in the orientation direction may be substantially the same.

In this context, "the parallel incision interval in the orientation direction has periodicity" means that the parallel incision interval in the orientation direction changes in the direction of the reinforcement fiber orientation at a certain periodicity.

In the meanwhile, "the parallel incision interval in the orientation direction is substantially the same" means that, when the average interval length of the nearest parallel incisions in the direction of the reinforcement fiber orientation is determined, proportion in number of the parallel incision intervals wherein ratio of each parallel incision interval in the orientation direction to the average (each interval of the parallel incisions in the orientation direction/ average interval of the parallel incisions in the orientation direction) is up to 0.5 or at least 1.5 is less than 5%.

The interval between the adjacent parallel incisions in the plane 5 perpendicular to the direction of the reinforcement fiber orientation in the prepreg (hereinafter referred to as the parallel incision interval in perpendicular direction) is arbitrary, and the interval may have periodicity. In this case, the parallel incision interval in perpendicular direction may have substantially same length, and when the parallel incision interval in perpendicular direction has the same length, this length and the Ws as described below may be the same or different.

In the present invention, "the parallel incision interval in perpendicular direction has periodicity" means that the interval of the parallel incisions in the perpendicular direction in the plane the same as the direction of the reinforcement fiber orientation in the prepreg changes at a certain periodicity in the perpendicular direction in the plane the same as the direction of the reinforcement fiber orientation.

"The parallel incision interval in the perpendicular direction is substantially the same" means that, when the average interval length of the nearest parallel incisions in the perpendicular direction in the plane the same as the direction of the reinforcement fiber orientation in the prepreg is determined, total proportion of the parallel incisions wherein the ratio of each parallel incision interval in the perpendicular direction to the average (each interval of the parallel incisions in the perpendicular direction/average interval of the parallel incisions in the perpendicular direction) is up to 0.5 or at least 1.5 is less than 5%.

With regard to the positional relationship between various types of the intersecting incisions and the parallel incisions, they may or may not be in contact with each other. When the intersecting incision and the parallel incisions are not in contact with each other, the distance between the intersecting incision and the parallel incision may be either constant or different. In the meanwhile, when the intersecting incision and the parallel incision are in contact with each other, the number of parallel incisions in contact with the intersecting incision and the number of intersecting incisions in contact with the parallel incisions are not particularly limited:

With regard to the positional relationship between the intersecting incisions and the parallel incisions, at least one parallel incision of the adjacent parallel incisions may be in contact with the intersecting incision. In this case, the parallel incision may be in contact with the intersecting incision at its end. Furthermore, the one parallel incision may be in contact with one end of an intersecting incision and another parallel incision which is adjacent to the one parallel incision in the plane perpendicular to the direction of the reinforcement fiber orientation may contact the opposite end of the same intersecting incision.

In addition, when the parallel incision contacts the intersecting incision, the length from the position of the parallel incision in contact with the intersecting incision to the end of the same parallel incision is not particularly limited, and in this case, the parallel incision may contact the intersecting incision at the center of the parallel incision.

In this context, "contacts" or "be in contact with" indicates that the intersecting incision crosses the parallel incision or that the intersecting incision contacts the parallel incision at least at one end thereof.

The "center" in the "at the center of the parallel incision" means that the length of the shorter one of the lengths between the end of the parallel incision and the position where the intersecting incision crosses the parallel incision is at least 0.3 times that of the length WL of the parallel incision.

The length of the intersecting incisions may be the same or different. However, the intersecting incisions preferably have substantially the same length in view of handling convenience of the incised prepreg and maintenance of the level of the mechanical properties and the surface quality of the molded article prepared by using the incised prepreg at a constant level.

In this context, "the intersecting incisions have substantially same length" means that the proportion of the number of the intersecting incisions having the ratio of the length of any intersecting incision to the value obtained by dividing the sum of the intersecting incised length in any area of 1 m² in the incised prepreg by the number of the intersecting incisions (average length of the intersecting incisions) (length of any intersecting incised/average length of the intersecting incisions) of up to 0.5 or at least 1.5 is less than 5%.

The length of the reinforcement fiber divided by the intersecting slit may be the same or different. However, the reinforcement fiber divided by the intersecting incision preferably has the same length L in view of handling convenience of the incised prepreg and maintenance of the level of the mechanical properties of the molded article prepared by using the incised prepreg at a constant level. This enables molding of an article having good three dimensional conformability while realizing high surface quality and excellent mechanical properties after the solidification with the mechanical properties retained at a certain level.

"The reinforcement fiber divided by the intersecting incision has the substantially same length L" means that proportion in the total prepreg area of the total area of the distribution of the fibers having a length which is at least 10 mm longer or shorter than the average length (which is designated L) of the reinforcement fiber which is divided by an intersecting incision and its nearest (pairing) intersecting incision which divides the same reinforcement fiber in any 1 m2 area of the incised prepregs is less than 5%.

The length of the parallel incisions may be the same or different. However, the parallel incisions preferably have substantially same length WL in view of the handling convenience of the incised prepreg and maintenance of the level of the mechanical properties of the molded article prepared by using the incised prepreg at a constant level.

In this context, "the parallel incisions have substantially same length WL" means total proportion of the intersecting incision wherein the ratio of each parallel incised length to the value obtained by dividing total length of the parallel incisions in any 1 m² area of the incised prepreg by the number of such parallel incisions (average of the parallel incised length which is designated WL) (length of each parallel incision/WL) is up to 0.5 or at least 1.5 is less than 5%.

Furthermore, in the incised prepreg of the present invention, the intersecting incisions have substantially same length W, and when the smaller one of the angles between the direction of the reinforcement fiber orientation and the intersecting incision is θ, this θ is substantially the same, and when the length of the intersecting incision projected to a plane which is perpendicular to the direction of the reinforcement fiber orientation of the prepreg is Ws and the value obtained by dividing Ws by W is Wt, Wt is in excess of 0.03 and up to 0.75. Wt is the angle between the intersecting incision and the direction of the reinforcement fiber orientation of the prepreg, and smaller Wt is preferable in view of suppressing the incision opening and maintaining the surface quality and mechanical properties. Wt is preferably at least 0.05 and up to 0.7 and more preferably at least 0.1 and up to 0.5.

In this context, "the smaller one of the angles between the direction of the reinforcement fiber orientation and the intersecting incision is substantially the same angle θ" means that, when the average of the smaller angle of the angles formed between the direction of the reinforcement fiber orientation and the intersecting incision is θ, proportion of the incisions is 5% or less wherein the angle based on θ is at least 2 degrees larger or at least 2 degrees less.

As described above, the intersecting incisions have substantially the same length, and preferably, the parallel incisions have substantially lame length WL. In the more preferable embodiment, the parallel incisions have substantially same length WL, and when the smaller one of the angles between the direction of the reinforcement fiber orientation and the intersecting incision is θ, this θ is substantially the same, and the reinforcement fibers divided by the intersecting incision have the same length L, and when the value obtained by dividing L by WL is Lr, Lr is greater than 1 and up to 300 so that the incised prepreg will have a high three dimensional conformability and molding of an article which exhibits high surface quality and excellent mechanical properties after the solidification is enabled. The Lr of up to 1 means that the parallel incision is longer than the divided reinforcement fiber and there is a risk that the prepreg is disintegrated by the falling of the fibers, and on the other hand, the Lr in excess of 300 means that the conformability is not sufficiently improved due to the insufficient parallel incised length. Lr is preferably in the range of 2 to 100, and more preferably 4 to 50.

Furthermore, when the length of the intersecting incisions projected to a plane which is perpendicular to the direction of the reinforcement fiber orientation of the prepreg is Ws and the value obtained by dividing WL by Ws is Wr, production of an intermediate substrate having both the parallel incisions and the intersecting incision exhibiting improved three dimensional conformability simultaneously with excellent mechanical properties is enabled when the Wr is in excess of 0 and up to 100. The Wr of 0 means absence of the parallel incisions, and the Wr in excess of 100 means that the conformability is not sufficiently improved due to the insufficient parallel incised length. The Wr is preferably 0.2 to 50, and more preferably 1 to 30.

In this context, "the length Ws which is the length of the intersecting incision when projected to a plane which is perpendicular to the direction of the reinforcement fiber orientation of the prepreg" means the length when the incision is projected by using the direction perpendicular to the direction of the reinforcement fiber orientation (direction 5 perpendicular to the fiber) as the projection plane, and the projection is conducted in the direction perpendicular to the projection plane (namely, in longitudinal direction 4 of the fiber), for example, as shown in FIG. 1.

In the more preferable embodiment of the incised prepreg of the present invention, the parallel incision has substantially length WL, the reinforcement fibers divided by the intersecting incisions have substantially same length L, when the smaller one of the angles between the direction of the reinforcement fiber orientation and the intersecting incision is θ, number of the intersecting incisions wherein the smaller one of the angles between the direction of the reinforcement fiber orientation and the intersecting incision is substantially the same angle θ in any 1 m² area in the incised prepreg is N1, and number of the parallel incision in any 1 m² area in the incised prepreg is N2, and the length of the intersecting incision projected to a plane which is perpendicular to the direction of the reinforcement fiber orientation of the prepreg is Ws, (WL×sin θ×N2)/(Ws×N1×L) is in excess of 0 mm$^{-1}$ and up to 10 mm$^{-1}$. When the value is in such range, production of an intermediate substrate having both the parallel incisions and the intersecting incision exhibiting improved three dimensional conformability simultaneously with excellent mechanical properties is enabled. The ratio of the length of the parallel incision to the intersecting incision of 0 mm$^{-1}$ means the absence of the parallel incisions while the ratio in excess of 10 mm$^{-1}$ invites difficulty in the maintenance of the mechanical properties due to the excessively short length of the reinforcement fiber divided by the intersecting incisions. The range of the (WL×sin θ×N2)/(Ws×N1×L) is preferably 0.025 to 8 mm$^{-1}$, more preferably 0.05 to 6 mm$^{-1}$, and still more preferably 0.1 to 4 mm$^{-1}$.

The preferred embodiment of the incised prepreg of the present invention can be defined by total length of the intersecting incisions and the parallel incisions in any 1 m$^2$ area in the incised prepreg. More specifically, the total length of the intersecting incisions and the parallel incisions in any 1 m$^2$ area in the incised prepreg is preferably in the range of 40 to 20000 m. When the total length is less than such range, the reinforcement fiber divided by the intersecting incisions will be too long, and the effect of improving the conformability by the provision of the intersecting incisions and the parallel incisions will not be realized. On the other hand, when the total length is in excess of such range, the fiber divided by the intersecting incisions will be too short for retaining the mechanical property, or the prepreg may become disintegrated by the falling of the fibers by the intersecting incisions or the parallel incisions. The total length is preferably in the range of 100 to 10000 m and more preferably 200 to 5000 m.

The preferred embodiment of the incised prepreg of the present invention can be defined by the ratio of the total length of the parallel incisions to the total length of the intersecting incisions in any 1 m$^2$ area in the incised prepreg. In this case, the ratio R of the total length of the parallel incisions to the total length of the intersecting incisions in any 1 m$^2$ area in the incised prepreg of the present invention (total length of the parallel incisions/total length of the intersecting incisions) preferably satisfies 0<R<100. The R of 0 means the absence of the parallel incisions, and the R of at least 100 means that the reinforcement fiber divided by the intersecting incisions will be too long to detract from shape conformity, or that the prepreg may become disintegrated by the falling of the fibers of the incised prepreg by the parallel incisions. The ratio R of the total length of the parallel incisions to the total length of the intersecting incisions in any 1 m$^2$ area in the incised prepreg of the present invention is preferably in the range of 0.25<R<50, and more preferably 0.5<R<30.

Exemplary methods used for the formation of the incisions in the prepreg in the production of the incised prepreg of the present invention include a method wherein a preliminary prepreg of reinforcement fibers aligned in one direction, namely, unidirectionally oriented fibers is first prepared and then the incisions are formed by a manual operation using a cutter or by a cutting machine and a method wherein the reinforcement fibers are incised open in the step of preparing the prepreg of the unidirectionally oriented fibers by continuously pressing the prepreg with a rotary blade roller having the blades arranged at predetermined position, laminating the preliminary prepregs and pressing the laminate with a tool having blades arranged at predetermined positions, or irradiating the fibers with laser to incise the fibers. Of these, the method by manual operation or the method using a cutter is suitable for simple formation of the incisions in the preliminary prepreg, the method using a press-cutting tool is suitable for mass production in view of production efficiency, and the method using the laser is suitable for forming the incisions in particularly selected positions in the prepreg. The methods are not limited to the preparation methods as described above.

When a rotary blade roller is used, the blades can be provided at predetermined positions of the roller by directly grinding the roller. However, use of a roller such as a magnet roller wrapped with a sheet having the blades arranged at predetermined positions prepared by grinding a plate is preferable in view of easier change of the blades. Use of such rotary blade roller enables satisfactory formation of a small incision (for example, with the incision length of up to 1 mm). After the incision formation, the incised prepreg may be thermally pressed with a roller or the like to facilitate filling and fusing of the resin in the incision portion to thereby improve the handling convenience.

Anyway, the production method of the incised prepreg of the present invention comprises the step 1 wherein the first incision is formed in the prepreg comprising the unidirectionally oriented reinforcement fibers and the resin, and the step 2 wherein the second incisions are formed in the prepreg, and preferably, the first incision is the incision crossing the fibers and the second incision is the incision parallel to the fibers. Such incision formation in divided steps facilitates production of the incised prepreg with stable qualities. In addition, the method employed in the incision formation of the step 1 and the step 2 does not have to be the same, and the incision formation may be accomplished by different procedures in the step 1 and step 2.

It is to be noted that the order of the step 1 and the step 2 is not limited and any one of the step 1 and the step 2 may be conducted as the initial step, and also, each of the step 1 and the step 2 may be conducted in two or more steps. In addition, the step 1 and the step 2 may be conducted at once when the step 1 and the step 2 can be conducted simultaneously, for example, when the methods used for the incision formation are different or simultaneous formation of the parallel incisions and the intersecting incisions is possible by the blades of the rotary blade roller.

Applications of the incised prepreg of the present invention and the fiber reinforced plastic prepared by using such prepreg include bicycle supplies, gears for golf and other sports such as shaft and head, automobile members such as door and sheet frame, and machine parts such as robot arm where strength, rigidity, and reduced weight are required. Of these, the incised prepreg of the present invention and the fiber reinforced plastic prepared by using such prepreg are particularly adapted for use in automobile members such as sheet panel and sheet frame having complicated shape where conformability as realized by the present material is required in addition to the strength and reduced weight.

EXAMPLES

Next, the present invention is described in further detail by referring to the Examples which by no means limit the scope of the present invention.
<Production of Incised Prepreg>

Incisions were formed in "TORAYCA (Trade mark)" prepreg sheet P3052S-15 (reinforcement fiber, T700S; resin, 2500, content by volume of the reinforcement fiber, 56%; a laminate of one side release paper) to obtain an incised prepreg having incisions regularly formed at an equal interval. The incisions were formed in the entire prepreg.

In Examples 1 and 2, the incisions were formed in two steps. In the first step, the intersecting incisions respectively having the angle θ between the intersecting incision and the reinforcement fiber of 14° and 90° which penetrate the prepreg sheet were formed by pushing the prepreg against a rotary blade roller having the blades arranged at predetermined positions to thereby form the intersecting incisions as the first incisions. In the second step, the parallel incisions which penetrate the prepreg sheet were formed as the second incisions. The prepreg sheet is supported by a release paper, and in the course of the incision formation, the release paper is incised to the depth of approximately 50% of its thickness.

In Example 3, the intersecting incisions having the angle θ between the intersecting incision and the reinforcement fiber of 45° and the parallel incisions were formed by using an automatic cutting machine. The prepreg sheet was incised together with the release paper by using the automatic cutting machine.

<In-Plane Shear Property Evaluation Test>

Predetermined prepreg was incised out in the direction of 45° by assuming direction of the reinforcement fiber orientation of the incised prepreg as 0° at a size of 150±1 mm (length)×50±1 mm (width). 8 layers were laminated ([45°/−45°]$_4$) to obtain the laminated substrate, and opposite ends of the tensile jig were secured by screws at 0.3 N·m using a torque wrench with the gauge length of 100 mm. After visually confirming that there was no wrinkles and sagging in the incised prepreg and the initial load was substantially 0 N under temperature condition of 60 degrees, the sample was pulled at a crosshead speed of 1.0 mm/minute to measure the load after 1 minute. In this Example, the tester used was table-top type tester "AUTOGRAPH AG-X plus (Registered Trademark)" manufactured by Shimadzu Corporation equipped with 100 N load cell. The number of the test pieces measured was 5, and the average was used for the load. The results of the in-plane shear property evaluation test are shown in the column of "Load (N)" in Table 2.

<Plate Molding Test>

Predetermined substrates were incised out in the direction of 0° by assuming direction of the reinforcement fiber orientation of the incised prepreg as 0° at a size of 100 mm×100 mm. 32 layers were laminated ([0°/90°]$_{8s}$), and the laminate was allowed to flow and cure with a heated press molding machine by applying a pressure of 12 MPa in an atmosphere of 150° C.×15 minutes to obtain a plate-shaped molded article. The resulting plate-shaped molded article was measured for its area, and area ratio was evaluated as the press elongation ratio by assuming the area of 100 mm×100 mm of the laminate as 1.

The shape of the incisions and the test results of the Examples the Comparative Examples are shown in Tables 1 and 2.

Example 1

Figure 2:
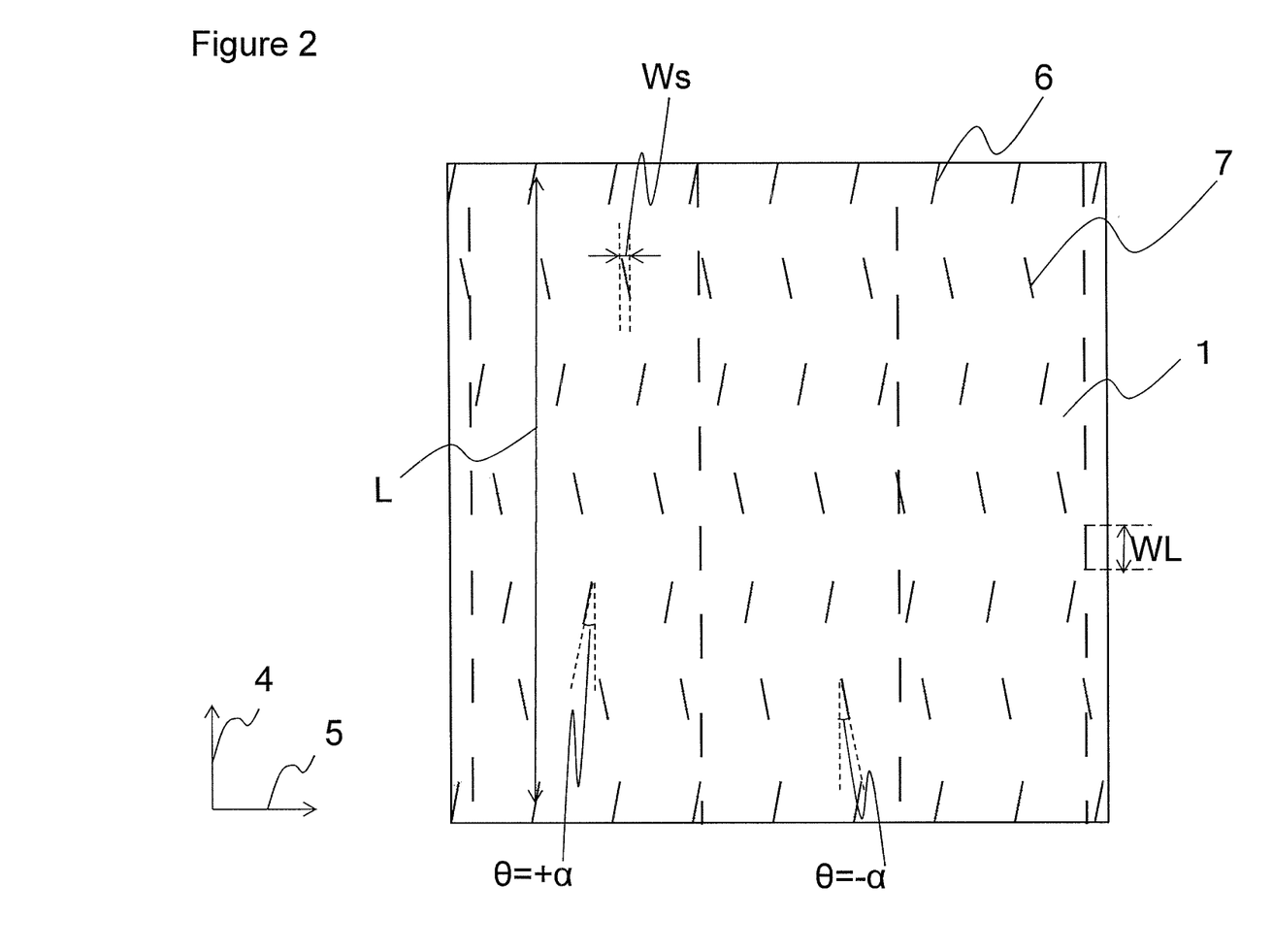
FIG. 2 shows an embodiment of the incised pattern used in the incised prepreg of the present invention.
Figure 3:
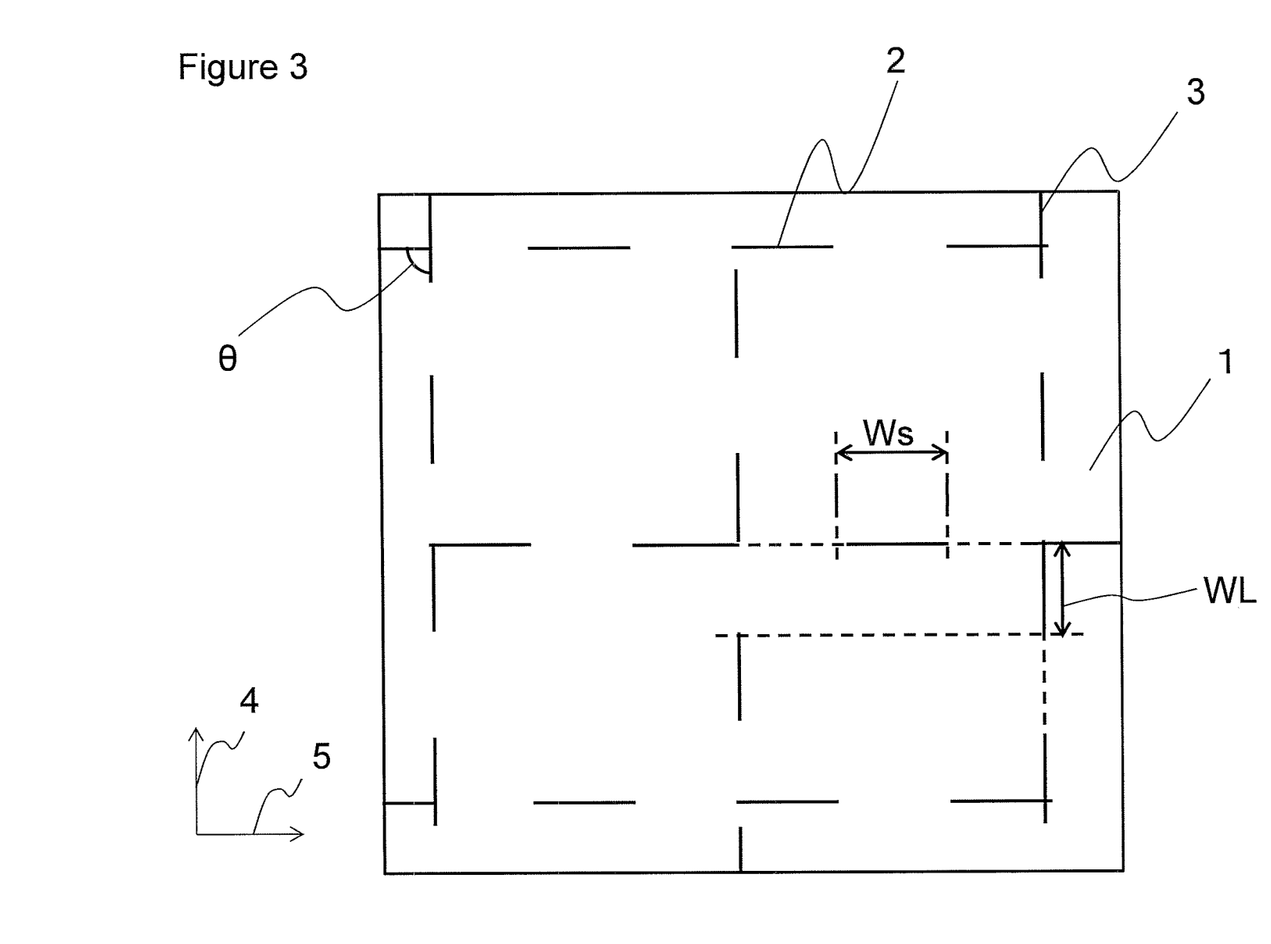
FIG. 3 shows another embodiment of the incised pattern used in the incised prepreg of the present invention.

The incision pattern of the incised prepreg was the incision pattern as shown in FIG. 2. The intersecting incisions had a substantially same length, and substantially all reinforcement fibers were divided by the intersecting incisions. The length L of the reinforcement fibers divided by the intersecting incisions was 25 mm, the projection length Ws of the intersecting incision projected to a plane which is perpendicular to the reinforcement fibers was 0.24 mm, the angle θ between the direction of the reinforcement fiber orientation and the intersecting incision was 14°, the length WL of the parallel incision was 1 mm, and the interval between the parallel incisions was 3.18 mm.

The Lr was 25, the Wr was 4.13, (WL×sin θ×N2)/(Ws×N1×L) was 0.04, the sum of the length of the incisions (total sum of the length of the intersecting incisions and the parallel incisions) in 1 m$^2$ was about 323 m, the ratio R of the total sum of the parallel incision length to the total sum of the intersecting incised length was 0.95. The resulting plate was extended in circular manner with the fibers becoming elongated while some breakage was noted along the edge, and the press elongation ratio was 2.2. The load of the in-plane shear property evaluation test was 1.2 N.

Example 2

The incision pattern of the incised prepreg was the incision pattern as shown in FIG. 3. The intersecting incisions had a substantially same length, and substantially all reinforcement fibers were divided by the intersecting incisions. The length L of the reinforcement fibers divided by the intersecting incisions was 25 mm, the projection length Ws of the intersecting incision projected to a plane which is perpendicular to the reinforcement fibers was 1 mm, the angle θ between the direction of the reinforcement fiber orientation and the intersecting incision was 90°, the length WL of the parallel incision was 1 mm, and the interval between the parallel incisions was 3.18 mm.

The Lr was 25, the Wr was 1, (WL×sin θ×N2)/(Ws×N1×L) was 0.16, the sum of the length of the incisions (total sum of the length of the intersecting incisions and the parallel incisions) in 1 m$^2$ was about 197 m, the ratio R of the total sum of the parallel incision length to the total sum of the intersecting incision length was 3.94. The resulting plate was extended in circular manner with the fibers becoming elongated, and the press elongation ratio was 2.3. The load in the in-plane shear property evaluation test was 1.1 N.

Example 3

Figure 4:
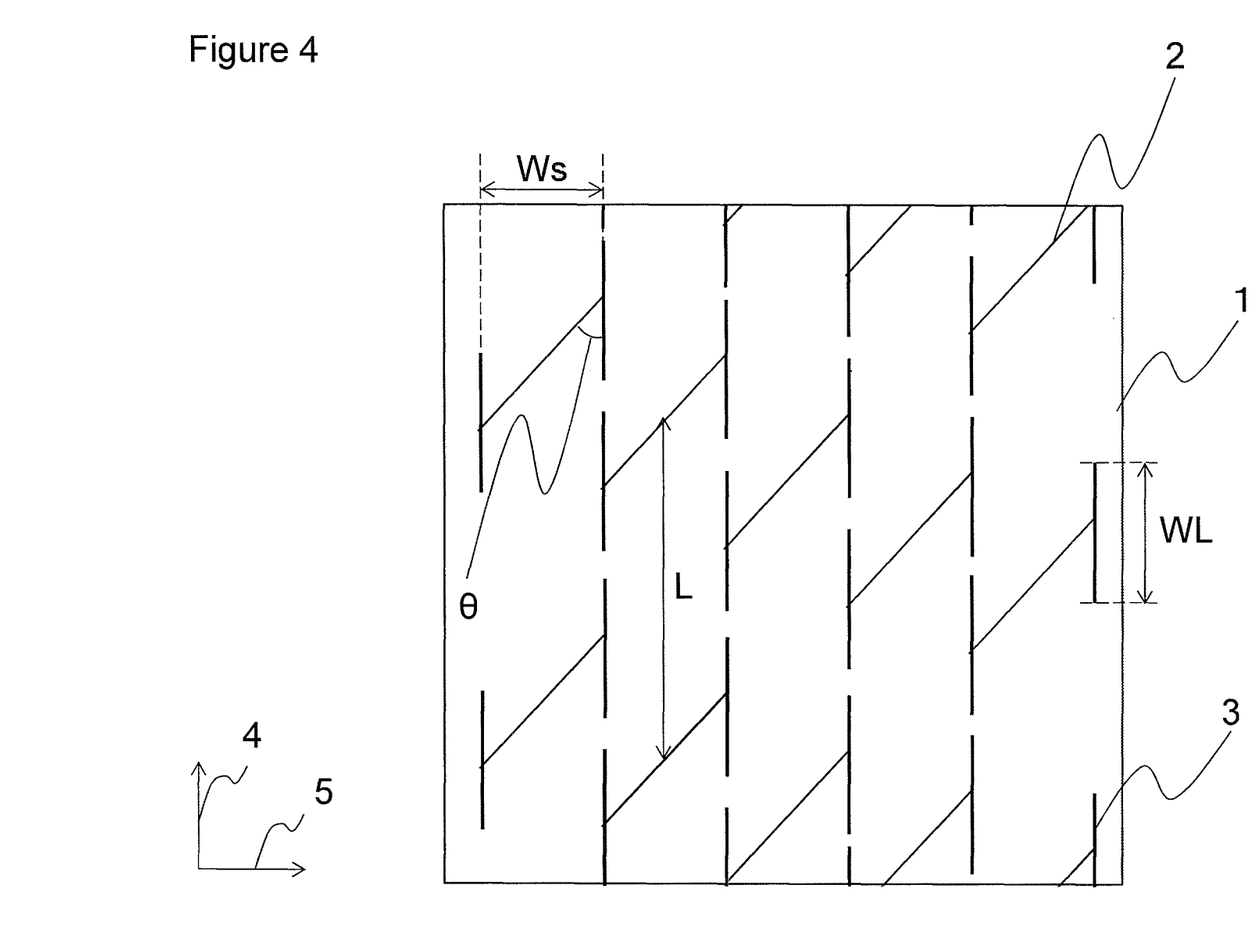
FIG. 4 shows another embodiment of the incised pattern used in the incised prepreg of the present invention.

The incision pattern of the incised prepreg was the incision pattern as shown in FIG. 4. The intersecting incisions had a substantially same length, and substantially all reinforcement fibers were divided by the intersecting incisions. The length L of the reinforcement fibers divided by the intersecting incisions was 25 mm, the projection length Ws of the intersecting incision projected to a plane which is perpendicular to the reinforcement fibers was 12.5 mm, the angle θ between the direction of the reinforcement fiber orientation and the intersecting incision was 45°, the length WL of the parallel incision was 10 mm, and the interval between the parallel incisions was 12.5 mm.

The Lr was 2.5, the Wr was 0.8, (WL×sin θ×N2)/(Ws×N1×L) was 0.05, the sum of the length of the incision (total sum of the length of the intersecting incisions and the parallel incisions) in 1 m$^2$ was about 120 m, the ratio R of the total sum of the parallel incision length to the total sum of the intersecting incision length was 1.13. The resulting plate was extended in circular manner with the fibers becoming elongated, and the press elongation ratio was 2.1. The load in the in-plane shear property evaluation test was 0.7 N.

Comparative Example 1

The incision pattern of the incised prepreg was the same as that of Example 1 except that the parallel incisions were not formed. The resulting plate was extended in circular manner with the fibers becoming elongated while some breakage was noted along the edge, and the press elongation ratio was 2.0. The load in the in-plane shear property evaluation test was 1.7 N.

Comparative Example 2

The incision pattern of the incised prepreg was the same as that of Example 2 except that the parallel incisions were not formed. The resulting plate was extended in circular manner with the fibers becoming elongated, and the press elongation ratio was 2.2. The load in the in-plane shear property evaluation test was 1.5 N.

Comparative Example 3

The incision pattern of the incised prepreg was the same as that of Example 3 except that the parallel incisions were not formed. The resulting plate was extended in circular manner with the fibers becoming elongated, and the press elongation ratio was 2.05. The load in the in-plane shear property evaluation test was 1 N.

TABLE 1

Incision pattern

| | Fiber length L (mm) | Projected length Ws (mm) | Incision angle θ (°) | Parallel incision length WL (mm) | Lr | Wr |
|---|---|---|---|---|---|---|
| Example 1 | 25 | 0.24 | 14 | 1 | 25 | 4.13 |
| Example 2 | 25 | 1 | 90 | 1 | 25 | 1 |
| Example 3 | 25 | 12.5 | 45 | 10 | 2.5 | 0.8 |
| Comparative Example 1 | 25 | 0.24 | 14 | — | | |
| Comparative Example 2 | 25 | 1 | 90 | | | |
| Comparative Example 3 | 25 | 12.5 | 45 | | | |

TABLE 2

| | (WL × sinθ × N2)/(Ws × N1 × L) | Total sum of the incision length (m) | R | Load (N) | Press elongation ratio |
|---|---|---|---|---|---|
| Example 1 | 0.04 | 323 | 0.95 | 1.2 | 2.2 |
| Example 2 | 0.16 | 197 | 3.94 | 1.1 | 2.3 |
| Example 3 | 0.05 | 120 | 1.13 | 0.7 | 2.1 |
| Comparative Example 1 | 0 | 165 | 0 | 1.7 | 2 |
| Comparative Example 2 | 0 | 40 | 0 | 1.5 | 2.2 |
| Comparative Example 3 | 0 | 57 | 0 | 1 | 2.05 |

In the table, the angle θ between the direction of the reinforcement fiber orientation and the intersecting incision is referred to as the incision angle θ.

EXPLANATION OF NUMERALS

1: prepreg
2: intersecting incision
3: parallel incision
4: direction of the reinforcement fiber orientation in the prepreg
5: plane perpendicular to the direction of the reinforcement fiber orientation in the prepreg
6: intermittent intersecting incisions (positive angle to the direction of the reinforcement fiber orientation)
7: intermittent intersecting incisions (negative angle to the direction of the reinforcement fiber orientation)
8: series of intermittent intersecting incisions (a case wherein the series of incisions form an intermittent straight line)
9: series of intermittent parallel incisions (a case wherein the series of incisions form an intermittent straight line)

The invention claimed is:

1. An incised prepreg comprising a resin and unidirectionally oriented reinforcement fibers formed with parallel incisions which are substantially parallel to the direction of the reinforcement fiber orientation and intersecting incisions intersecting the reinforcement fibers, wherein:
the intersecting incisions have substantially same length W,
when the smaller one of the angles between the direction of the reinforcement fiber orientation and the intersecting incision is θ, this θ is substantially the same, and
when the intersecting incision is projected to a plane which is perpendicular to the direction of the reinforcement fiber orientation of the prepreg and the projected length is Ws, and the value obtained by dividing Ws by W is Wt, Wt is in excess of 0.03 and up to 0.75.

2. The incised prepreg according to claim 1 wherein total sum of the length of the intersecting incisions and the parallel incisions of the incised prepreg in any 1 $m^2$ area is 40 to 20000 m.

3. The incised prepreg according to claim 1 wherein ratio R of the total sum of the length of the parallel incisions to the total sum of the length of the intersecting incisions in any 1 $m^2$ area satisfies 0<R<100.

4. A fiber reinforced plastic produced by using the incised prepreg according to claim 1.

5. An incised prepreg comprising a resin and unidirectionally oriented reinforcement fibers formed with parallel incisions which are substantially parallel to the direction of the reinforcement fiber orientation and intersecting incisions intersecting the reinforcement fibers, wherein:
the parallel incisions have substantially same length WL,
the reinforcement fibers divided by the intersecting incisions have substantially same length L,
when the smaller one of the angles between the direction of the reinforcement fiber orientation and the intersecting incision is θ, this θ is substantially the same, and
when the intersecting incision is projected to a plane which is perpendicular to the direction of the reinforcement fiber orientation of the prepreg and the projected length is Ws, the value obtained by dividing L by WL is Lr, and the value obtained by dividing WL by Ws is Wr, Lr is in excess of 1 and up to 300, and Wr is in excess of 0 and up to 100.

6. The incised prepreg according to claim 5 wherein total sum of the length of the intersecting incisions and the parallel incisions of the incised prepreg in any 1 $m^2$ area is 40 to 20000 m.

7. The incised prepreg according to claim 5 wherein ratio R of the total sum of the length of the parallel incisions to the total sum of the length of the intersecting incisions in any 1 $m^2$ area satisfies 0<R<100.

8. A fiber reinforced plastic produced by using the incised prepreg according to claim 5.

9. An incised prepreg comprising a resin and unidirectionally oriented reinforcement fibers formed with parallel incisions which are substantially parallel to the direction of the reinforcement fiber orientation and intersecting incisions intersecting the reinforcement fibers, wherein:

the parallel incisions have substantially same length WL, the reinforcement fibers divided by the intersecting incisions have substantially same length L, when the smaller one of the angles between the direction of the reinforcement fiber orientation and the intersecting incision is $\theta$, the number of the intersecting incisions in any 1 m$^2$ area in the smaller one of the angles between the direction of the reinforcement fiber orientation and the intersecting incision is substantially the same angle $\theta$ is N1, and number of the parallel incisions in any 1 m$^2$ area in the incised prepreg is N2, and the length of the intersecting incision projected in the perpendicular direction in the plane the same as the direction of the reinforcement fiber orientation of the prepreg is Ws, (WL×sin $\theta$×N2)/(Ws×N1×L) is in excess of 0 mm$^{-1}$ and up to 10 mm$^{-1}$.

10. The incised prepreg according to claim 9 wherein total sum of the length of the intersecting incisions and the parallel incisions of the incised prepreg in any 1 m$^2$ area is 40 to 20000 m.

11. The incised prepreg according to claim 9 wherein ratio R of the total sum of the length of the parallel incisions to the total sum of the length of the intersecting incisions in any 1 m$^2$ area satisfies 0<R<100.

12. A fiber reinforced plastic produced by using the incised prepreg according to claim 9.

* * * * *